(12) United States Patent
Kenyon

(10) Patent No.: US 11,371,867 B2
(45) Date of Patent: Jun. 28, 2022

(54) FLUID FLOW OBSTRUCTION DEVICE FOR A PROCESS FLUID FLOW MEASUREMENT DEVICE

(71) Applicant: Rosemount Inc., Shakopee, MN (US)

(72) Inventor: Nathaniel Kirk Kenyon, Westminster, CO (US)

(73) Assignee: ROSEMOUNT INC., Shakopee, MN (US)

( * ) Notice: Subject to any disclaimer, the term of this patent is extended or adjusted under 35 U.S.C. 154(b) by 0 days.

(21) Appl. No.: 17/098,917

(22) Filed: Nov. 16, 2020

(65) Prior Publication Data
US 2022/0155113 A1    May 19, 2022

(51) Int. Cl.
*G01F 1/40* (2006.01)
*F15D 1/02* (2006.01)

(52) U.S. Cl.
CPC .............. *G01F 1/40* (2013.01); *F15D 1/025* (2013.01)

(58) Field of Classification Search
CPC ................................ F15D 1/0125; F15D 1/025
See application file for complete search history.

(56) References Cited

U.S. PATENT DOCUMENTS

| | | | | |
|---|---|---|---|---|
| 4,926,698 A | * | 5/1990 | Owen | G01F 1/42 73/861.61 |
| 4,961,349 A | * | 10/1990 | Tanis | G01F 1/40 73/861.52 |
| 7,918,134 B2 | | 4/2011 | Hedtke et al. | |
| 8,752,433 B2 | | 6/2014 | Hedtke | |
| 9,377,334 B2 | * | 6/2016 | Hadjioannou | G01F 1/40 |

FOREIGN PATENT DOCUMENTS

| | | |
|---|---|---|
| CN | 201293661 | 8/2009 |
| CN | 205317269 | 6/2016 |
| CN | 208043141 | 11/2018 |
| KR | 2015-0115471 | 10/2015 |

OTHER PUBLICATIONS

Notification of Transmittal of the International Search Report and the Written Opinion of the International Searching Authority from PCT/US2021/042181, dated Oct. 27, 2021.

* cited by examiner

*Primary Examiner* — Justin N Olamit
(74) *Attorney, Agent, or Firm* — Westman Champlin & Koehler, P.A.

(57) ABSTRACT

A fluid flow obstruction device for a process fluid flow measurement device includes a first wall having a first side. A second wall having a proximate end is arranged at a proximate end of the first side of the first wall. The arrangement forms a first apex between the first wall and the second wall. At least one additional wall is arranged parallel to the second wall at a distance from the proximate end of the first side of the first wall. The arrangement of the at least one additional wall and the first wall forms a corresponding additional apex.

19 Claims, 13 Drawing Sheets

FIG. 3A  FIG. 3B

FLUID FLOW OBSTRUCTION DEVICE FOR A PROCESS FLUID FLOW MEASUREMENT DEVICE

BACKGROUND

The present invention is related to industrial process control and measurement devices. More particularly, the invention is related to a device that measures fluid flow of a process fluid.

Field devices, such as process variable transmitters, are used by a number of industries to remotely sense or control a process variable. Such process variables are generally associated with fluids such as slurries, liquids, vapors, gasses, chemicals, pulp, petroleum, pharmaceuticals, food and other fluid processing plants. Process variables may include pressure, temperature, flow, turbidity, density, concentration, chemical compensation and other properties. Other examples of field devices include valves, actuators, heaters and controllers.

An industrial process fluid flow measurement device generally requires multiple components. For example, one type of process fluid flow transmitter includes a fluid obstruction device disposed in the fluid flow within a conduit. The process flow transmitter then measures a differential pressure before and after the fluid obstruction device, such as an orifice plate, v-cone, or conditioning orifice plate, in the fluid conduit and calculates the mass or volumetric flow of the fluid passing therethrough. The fluid obstruction device causes a differential pressure to be developed between the upstream and downstream sides of the obstruction, which is related to the flow rate of the fluid. The process variable fluid flow transmitter then conveys the fluid flow information to a process controller, which may be a computer located in a control room, or even another field device mounted in the field.

Wedge-style flow meters are typically pipe-spool style flow meters that use a fluid obstruction device in a wedge shape to restrict the pipe and generate a differential pressure signal. Instrument branches transmit the differential pressure signal to a differential pressure transmitter generally through remote seals. One advantage of a wedge-style flow meter is that the wedge element wears out at a much slower rate than an orifice plate. Wedges are typically used to measure flow in viscous, erosive or particle ridden flows not well-suited for orifice plates. Two of the most common wedge flow meter designs are an external wedge element and an internal wedge element.

External wedge elements are generally made from angle-bar and welded into a V-shaped slot on the flow meter body. The advantage of external wedge flow meters is that little specialized manufacturing equipment or tooling is required. The size of the external wedge element can be controlled by the size of the V-shaped slot and the size of the angle-bar used. A disadvantage of external wedge flow meters in the potentially reduced accuracy of the flow measurement due to the tolerances and weld deformation of the geometries involved. External wedges must be calibrated to obtain reasonable measurement accuracy.

Internal wedge elements slide into the meter body where they are anchored into position. The outer diameter of the wedge element is slightly under sized from the wedge meter conduit body inner diameter to allow it to slide in. The rounded wedge shape of an internal wedge does not lend itself to traditional machining methods, i.e. milling, computer numerical control (CNC), etc., due to the difficulty in fixturing/holding the wedge element. Internal wedges are typically fabricated by first turning the outside diameter of a bar on a lathe to match the inner diameter of the wedge meter, then using wire electrical discharge machining (EDM) to cut wedge shape from the bar stock. An advantage of internal wedges made this way is a higher accuracy than external wedges due to the improved manufacturing tolerances. Disadvantages of internal wedges may include material waste, a heavy and dense wedge element, specialized EDM process capabilities are required and large bar stock must be inventoried and processed resulting in material handling risks.

SUMMARY

According to some aspects of this description, a fluid flow obstruction device for a process fluid flow measurement device includes a first wall having a first side. A second wall having a proximate end is arranged at a proximate end of the first side of the first wall. This arrangement forms a first apex between the first wall and the second wall. At least one additional wall is arranged parallel to the second wall at a distance from the proximate end of the first side of the first wall. The arrangement of the at least one additional wall and the first wall forms a corresponding additional apex.

According to some aspects of this description, a method of manufacturing a fluid flow obstruction device for a process fluid flow measurement device includes providing a first wall having a first side and arranging a second wall at a proximate end of the first side of the first wall, forming a first apex. Further, arranging at least one additional wall parallel to the second wall at a distance from the proximate end of the first side of the first wall, forming a corresponding additional apex.

According to some aspects of this description, a system for measuring process fluid flow includes a fluid flow conduit having an inlet and an outlet. A fluid flow obstruction device is arranged in a body of the fluid flow conduit between the inlet and the outlet. The fluid flow obstruction device comprises a first wall having a first side. A second wall having a proximate end is arranged at a proximate end of the first side of the first wall. This arrangement forms a first apex between the first wall and the second wall. At least one additional wall is arranged parallel to the second wall at a distance from the proximate end of the first side of the first wall. The arrangement of the at least one additional wall and the first wall forms a corresponding additional apex. Differential pressure sensors are disposed to sense differential process fluid pressure on either side of the fluid flow obstruction device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 3A illustrates a cross sectional schematic view a fluid flow conduit;

FIG. 3B illustrates a front cross-sectional schematic view of a fluid flow conduit;

DETAILED DESCRIPTION OF ILLUSTRATIVE EMBODIMENTS

Figure 1:
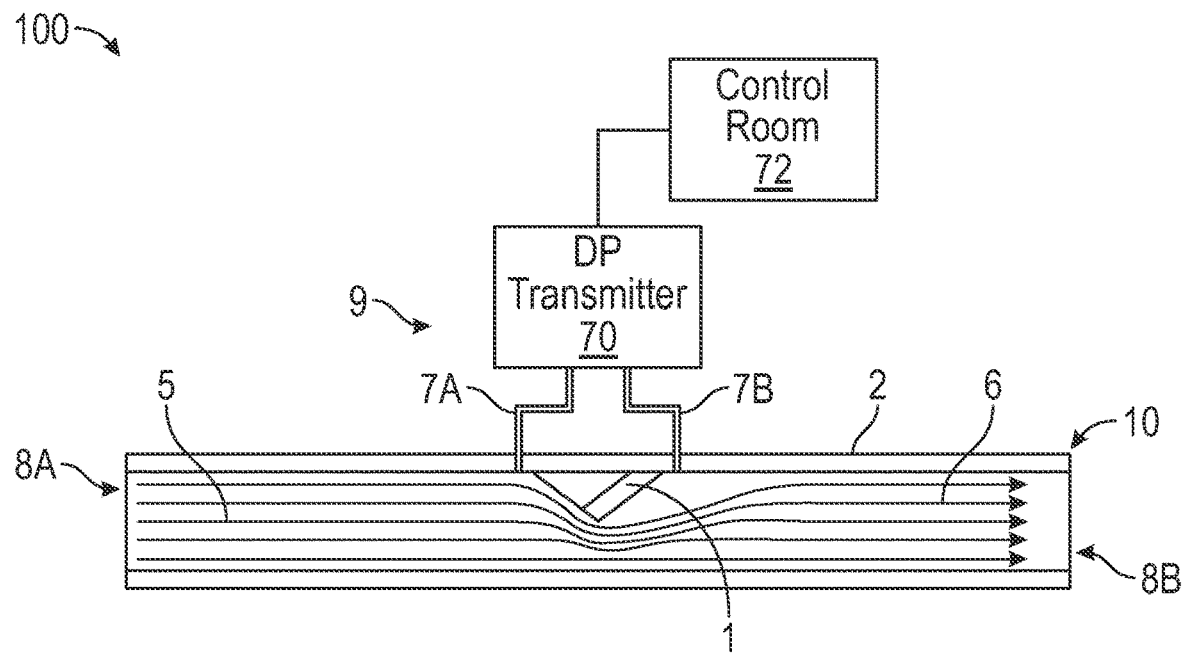
FIG. 1 illustrates a schematic embodiment of a pressure fluid flow measurement device.

FIG. 1 shows a schematic of a process control system 100 with a flowmeter 9 having a fluid flow conduit 10, such as a pipe, having an inlet and an outlet and a differential pressure transmitter 70. A fluid flow obstruction device 1, embodied as a wedge element, is arranged within a body 2 of fluid flow conduit 10. As illustrated in FIG. 1, fluid is shown to flow in a direction from an inlet 8A to an outlet 8B of the fluid flow conduit 10. The constriction introduced by the fluid flow obstruction device 1 results in a differential pressure between each side of fluid flow obstruction device 1. The differential pressure is related to flow rate and is measured by differential pressure transmitter 70 and translated to a flow rate measurement.

Figure 2A:
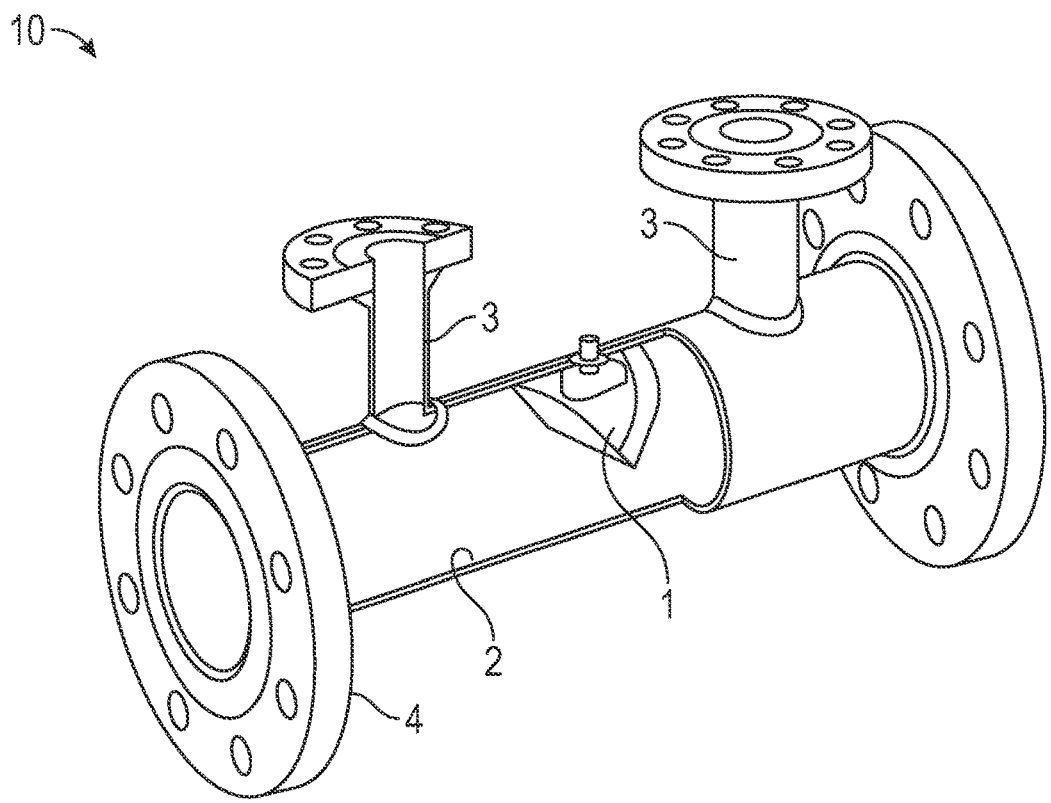
FIG. 2A illustrates a cutaway view of a fluid flow conduit with an internal wedge element as a fluid flow obstruction device.

FIG. 2A illustrates a cutaway view of fluid flow conduit 10 of process control system 100 having an internal wedge element as fluid flow obstruction device 1. Flanges 3 transmit the differential pressure signal, i.e. high-pressure signal through connection 7A and low-pressure signal through connection 7B, to differential pressure transmitter 70. Sensor 75 (See FIG. 2B) is disposed to sense high-pressure signal, i.e. pressure P1 and low-pressure signal, i.e. pressure P2, on either side of fluid flow obstruction device 1.

Figure 2B:
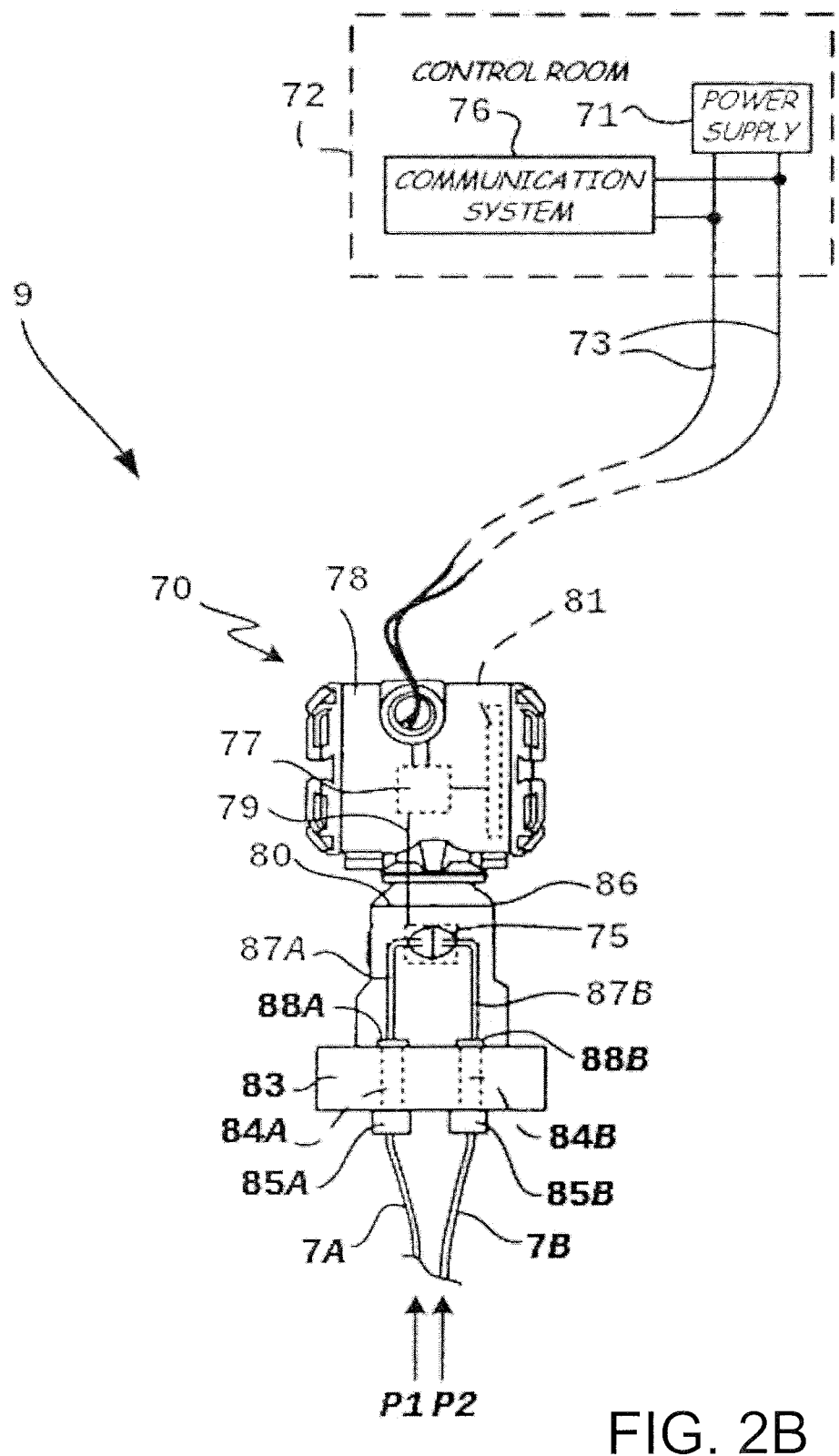
FIG. 2B illustrates an embodiment of the differential pressure transmitter and control room of FIG. 1.

FIG. 2B illustrates an example embodiment of process control system 100 which includes differential pressure (DP) transmitter 70 and a control room 72. Differential pressure transmitter 70 includes a sensor 75 that senses the pressure difference between pressure P1 and pressure P2 in a process fluid and then relays an electronic signal to control room 72 over control loop 73. In this example, control room 72 also supplies power to differential pressure transmitter 70 from power supply 71 over control loop 73. Control loop 73 also enables communication system 76 to communicate between control room 72 and differential pressure transmitter 70. In various embodiments, control loop 73 is a two-wire communication circuit, such as a 4-20 mA current loop or process control industry standard HART® or Fieldbus loop. In other embodiments, differential pressure transmitter 70 and control room 72 communicate over a wireless network such as WirelessHART®. In still other embodiments, output of differential pressure transmitter 70 is readable by a handheld device linked by wires or wirelessly with differential pressure transmitter 70.

Differential pressure transmitter 70 includes transmitter circuitry 77, sensor 75 and electronics housing 78. Transmitter circuitry 77 is electronically connected through wiring 79 to electronics board 80 for communication with control loop 73. Transmitter circuitry 77 includes components for transmitting electrical pressure signals generated by pressure sensor 75 over control loop 73 to control room 72 or to a local display such as LCD screen 81, or both. Transmitter circuitry 77 conditions the output of sensor 75 into a format compatible with control loop 73.

Sensor 75 is connected to the process fluid through connections 7A and 7B. Process flange 83 includes channels 84A and 84B, and connectors 85A and 85B. Sensor module 86 includes isolation tubes 87A and 87B and isolation diaphragm 88A and 88B. Isolation tubes 87A and 87B comprise passageways that are coupled with sensor 75 at their first ends and isolation diaphragms 88A and 88B at their second ends. Isolation diaphragms 88A and 88B are connected with process flange 83, which is typically bolted or secured to base of sensor module 86.

Figure 2C:
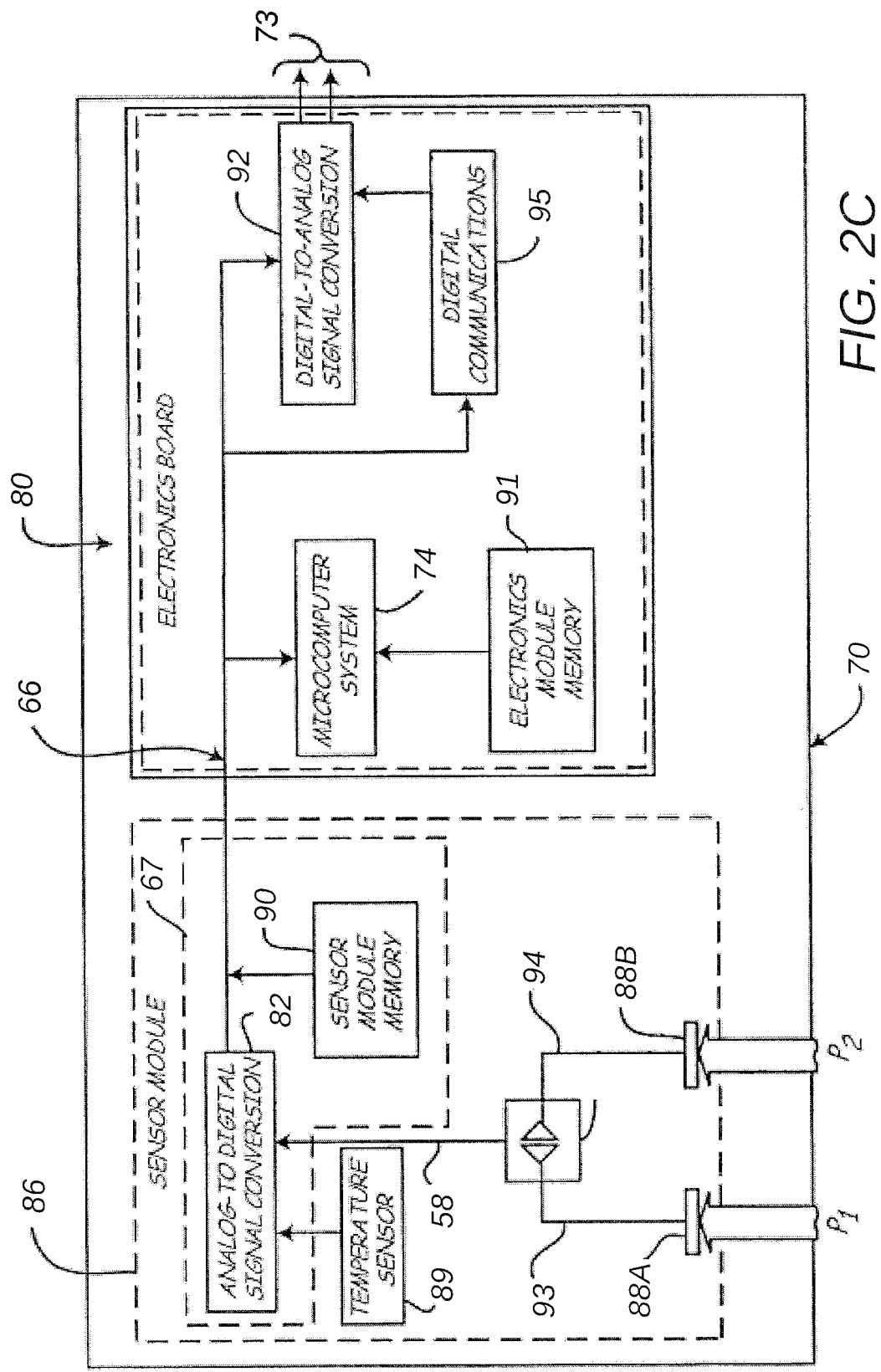
FIG. 2C illustrates a simplified block diagram of the differential pressure transmitter of FIG. 1.

FIG. 2C is a simplified block diagram illustrative of DP transmitter 70. DP transmitter 70 includes sensor module 86 and electronics board 80 coupled together through a data bus 66. Sensor module electronics 67 includes sensor 75 which receives pressures P1 and P2 of the process fluid and provides an output 58 related to the differential pressure to an analog to digital converter 82. An optional temperature sensor 89 can be used for temperature compensation is also illustrated along with sensor module memory 90. Electronics board 80 includes a microcomputer system or microprocessor 74, electronics module memory 91, digital to analog signal convertor 92 and digital communication block 95.

Also illustrated in FIG. 2C are capillary or "fill" tubes 87A and 87B which are used to couple the sensor 75 to the process fluid. Isolation diaphragms 88A and 88B receive pressures P1 and P2, respectively, from the process fluid which is responsively applied to a fill fluid carried in capillary tubes 93 and 94. Through this fluid fill, the pressures of the process fluid are applied to the sensor 75.

The size of the fluid flow obstruction device 1, shaped as an internal wedge element, creates different h/D ratios within fluid flow conduit 10, resulting in different differential pressure signals for a given flow rate. As illustrated in FIGS. 3A-3D, h/D ratio refers to the ratio between a height h of the space between the interior wall of the fluid flow conduit 10 and fluid flow obstruction device 1, or an apex of the wedge element, and the interior diameter D of body 2 of fluid flow conduit 10. Most wedge-style flow meter manufacturers offer h/D ratios in increments of 0.05 or 0.10 between 0.20 and 0.60 to satisfy most variation needs while containing the iterations to a finite value. Each flow application is looked at on a case-by-case basis to size the best wedge element. Factors that may be considered when determining a wedge element correspond to a given differential pressure within a given interior fluid flow conduit 10, or pipe, diameter D may include: minimum, normal and maximum Reynold's numbers, permanent pressure loss, accuracy of flow rate measurement, target differential pressure value at normal/maximum flow rates and transmitter differential pressure range.

Figure 3C:
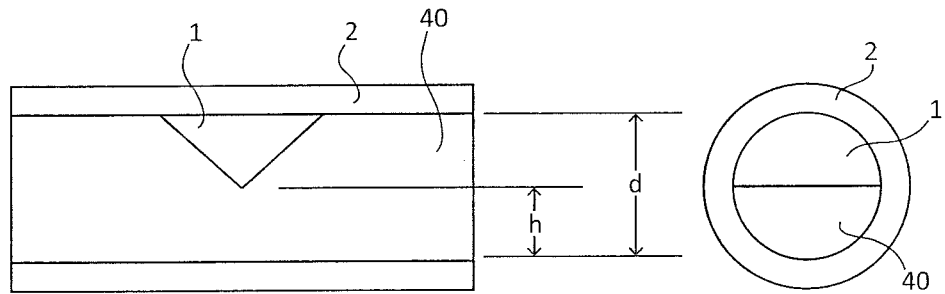
FIG. 3C illustrates a cross-sectional schematic view of a fluid flow conduit.
Figure 3C:
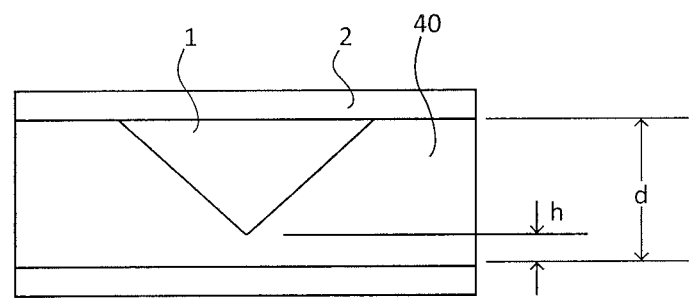

FIGS. 3A-3D illustrates a schematic cross-section of fluid flow conduit 10 with fluid flow obstruction device 1 arranged in body 2 of fluid flow conduit 10. Specifically, FIGS. 3A-3D illustrates the h/D ratio of fluid flow conduit 10. The h/D ratio indicates how much pipe area is open for fluid flow compared to closed at the wedge, or restriction, apex. FIG. 3A illustrates a ratio in a wedge flow meter to be approximately 0.5, where the height h of available space in body 2 from fluid flow obstruction device 1 is approximately half the diameter D of the interior of body 2. FIG. 3B illustrates a front cross-sectional schematic of FIG. 3A looking into body 2 of fluid flow conduit 10. Fluid flow obstruction device 1 is shown to leave approximately half of fluid flow conduit 10 open for fluid flow.

Figure 3D:
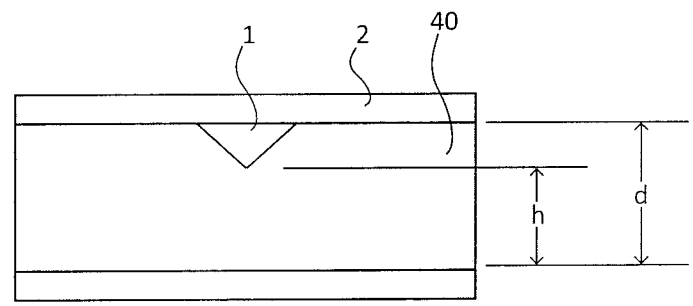
FIG. 3D illustrates a cross-section schematic view of a fluid flow conduit.

FIGS. 3C and 3D show variations of FIG. 3A, by varying the h/D ratio. FIG. 3C illustrates a small h/D ratio, i.e. 0.2, where fluid flow obstruction device 1 leaves space within fluid flow conduit 10 a height h, which is less than half the diameter D of body 2. FIG. 3D illustrates a large h/D ratio, i.e. 0.6, where fluid flow obstruction device 1 leaves space within body 2 a height h, which is greater than half the diameter D of the body 2 of fluid flow conduit 10.

Figure 4A:
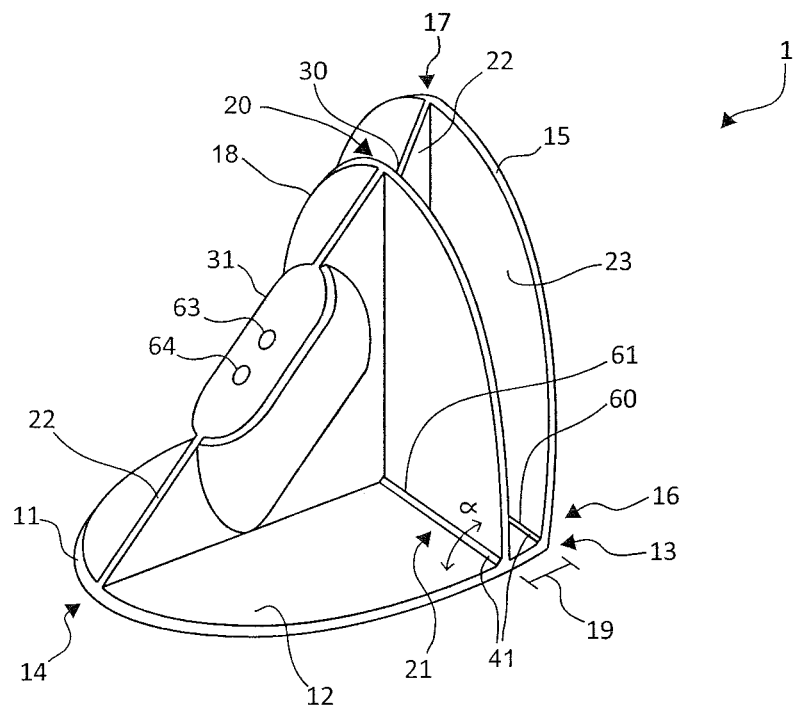
FIG. 4A illustrates an embodiment of a fluid flow obstruction device.
Figure 4B:
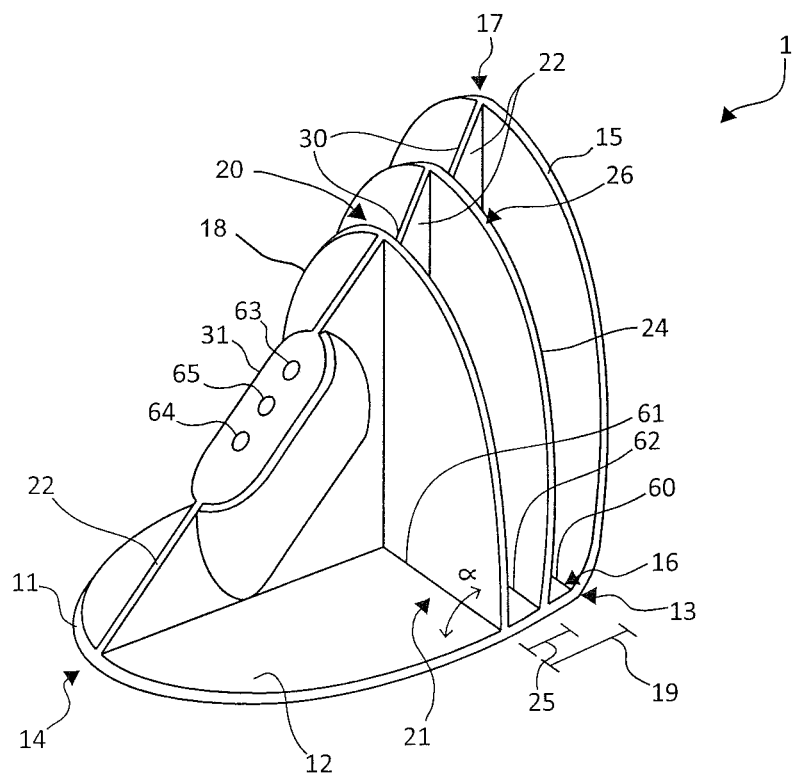
FIG. 4B illustrates an embodiment of a fluid flow obstruction device.

FIGS. 4A and 4B illustrate embodiments of fluid flow obstruction device 1 having a plurality of walls arranged at locations, or specific h/D ratio points, associated with discreet h/D ratios. A particular h/D ratio is obtained by cutting along a cutting side of the wall of the particular h/D ratio and removing the additional wall and rib material of fluid flow obstruction device 1 that is outside the particular h/D ratio. The material is minimized to locations only where necessary for anchoring, structural robustness and relevant h/D ratio walls. This reduces the amount of material, making a lighter and less dense internal wedge element.

FIG. 4A shows fluid flow obstruction device 1, embodied as an internal wedge element, having a plurality of walls. Each wall providing a structural rigidity in all directions. Fluid flow obstruction device 1 includes a first wall 11, or an upstream wall, and a second wall 15, or a downstream wall. A first wall proximate end 13 is arranged at an angle α to a second wall proximate end 16 at a first apex 60. At least one additional wall, such as third wall 18, is arranged parallel to second wall 15 having a second apex 61 and the third wall proximate end 21 is arranged on first side 12 of first wall 11 at a distance 19 from first wall proximate end 13. In a non-limiting embodiment, an interior of each apex 60, 61 includes larger fillets 41, or a thicker portion, to prevent wear on the apex, i.e. from fluid flow 40, from compromising the integrity of fluid flow obstruction device 1 for use in erosive applications.

In a further embodiment, at least one structural rib 22 is arranged linearly from a first wall distal end 14 to a second wall distal end 17 intersecting third wall distal end 20. Although only one rib is shown, more ribs may be included. Rib 22 is arranged perpendicular to first wall 11 and second wall 15, intersecting third wall 18. In a non-limiting embodiment, rib 22 extends along first side 12 of first wall 11. As illustrated in the embodiment of FIG. 4A, rib 22 extends along the length of first side 12 of first wall 11. Rib 22 further extends along a length of a second wall interior side 23.

In a further embodiment, rib 22 includes at least one notch 30, or saw guide notch, arranged along a third wall cutting side 32. Notch 30 may be an area of rib 22 such that rib 22 does not extend all the way to third wall distal end 20 along the third wall cutting side 32.

The above arrangement of fluid flow obstruction device 1 advantageously allows fluid flow obstruction device 1 to be modified to accommodate different h/D ratio requirements. A band saw or equivalent may cut through rib 22 along third wall cutting side 32, leaving the specified h/D ratio intact, i.e. third wall 18, and cutting away a portion of rib 22 and the entirety of second wall 15. The remaining wedge, comprising first wall 11 and third wall 18, may be ground and milled flush along third wall cutting side 32.

FIG. 4B includes the features of FIG. 4A, but further includes at least one additional wall 24 arranged parallel to, and between, second wall 15 and third wall 18 at a distance 25 from first wall proximate end 13 and having a corresponding additional apex 62. Although FIG. 4B shows only additional wall 24, further iterations of walls may also be included. Rib 22, as with third wall 18, is arranged to intersect additional wall 24 at a perpendicular angle.

In a further embodiment, fluid flow obstruction device 1 further includes an anchor boss 31 arranged on structural rib 22 between first wall 11 and third wall 18. Anchor boss 31 may optionally include a plurality of starter holes 63, 64, 65 for an anchor 35 (illustrated in FIGS. 4A-4B), such as a stud, bolt, etc. Each starter hole 63, 64, 65 corresponds to an apex 60, 61, 62. Anchor 35 connects fluid flow obstruction device 1 to body 2 of fluid flow conduit 10. In an alternative embodiment, anchor boss 31 includes a single starter hole 63. In this configuration starter hole 63 may not align with the apex of the appropriate h/D ratio wall.

In an embodiment, the length of first wall 11 is substantially equal to the length of second wall 15. Additional wall heights, such as the heights of third wall 18 and additional wall 24, is substantially equal to the length of first wall 11 minus the distance from the wall to the first wall proximate end 13. In this embodiment, the second wall 15 is taller than third wall 18 and additional wall 24.

Figure 5:
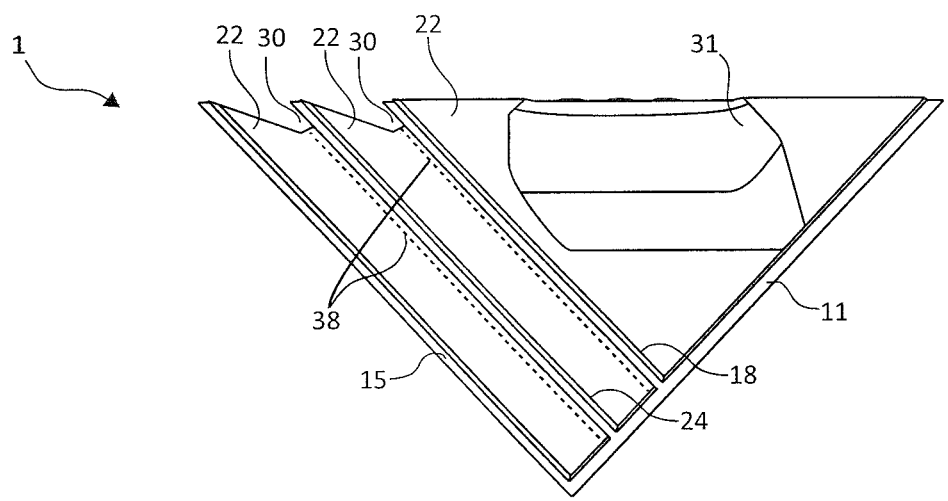
FIG. 5 illustrates a side-view of a fluid flow obstruction device.

FIG. 5 illustrates a side view of an embodiment of fluid flow obstruction device 1 further showing notches 30, or saw guide slots, adjacent to second wall 15 and additional wall 24, respectively. As discussed with FIG. 4A, notches 30 are arranged near the cuttable side of a given h/D ratio wall, or third wall 18 and/or additional wall 24. Notch 30 may be formed in a variety of shapes. The embodiment illustrated in FIG. 5 shows notch 30 having a blunt end. Other embodiments may include having notch 30 with a sharp end. Notch 30 allows a bandsaw, or other cutting element, to naturally start against third wall cutting side 32 or an additional wall cutting side 33. The blunt end arrangement of notch 30 further guides the cutting element improving the cutability of fluid flow obstruction device 1. With this arrangement, rib 22 is the path of least resistance for a cutting element 55 (illustrated in FIG. 6) to and through first wall 11 of fluid flow obstruction device 1 as cutting element 55 follows the wall through the rib 22. Additionally, or alternatively, the cutting guide includes, or is embodied as, perforations 38 or further material reductions that may be introduced at predetermined cut points in rib 22.

Figure 6:
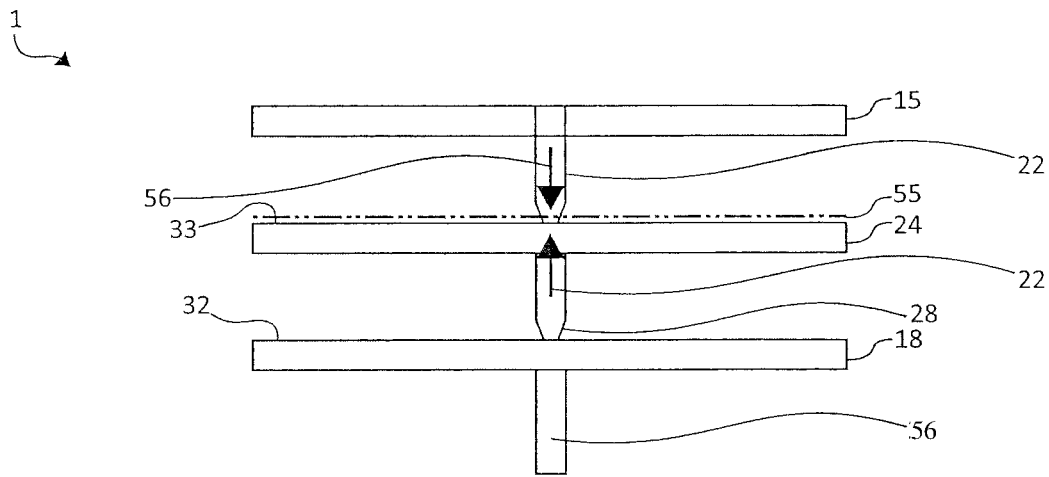
FIG. 6 illustrates an embodiment of the ribs of a fluid flow obstruction device.

FIG. 6 illustrates an alternative or additional embodiment of fluid flow obstruction device 1 where rib 22 has a taper 28 as a cutting guide on at least one side of rib 22 along the length of third wall cutting side 32 and/or additional wall cutting side 33, providing a cutting guide for cutting element 55. Taper 28 is arranged adjacent to the h/D ratio wedge walls, i.e. third wall cutting side 32 and additional wall cutting side 33. This configuration uses the rib material thickness and the wall material thickness to keep cutting element 55 on the path, indicated by arrows 56, directly flush with the wall edge. The excess material on each side of cutting element 55, i.e. the wall and the rib material outside taper 28, pushes cutting element 55 to the desired path 56, combatting blade wander.

The above embodiments advantageously allows for a plurality of h/D ratios to be manufactured with only a few fluid flow obstruction devices, since multiple h/D ratios are manufactured in a single fluid flow obstruction device. When a specific h/D ratio is desired, the fluid flow obstruction device 1 with the requested h/D ratio may be prepared as part of a late-stage customization, or modification of fluid flow obstruction device 1 after it has been manufactured.

Figure 7:
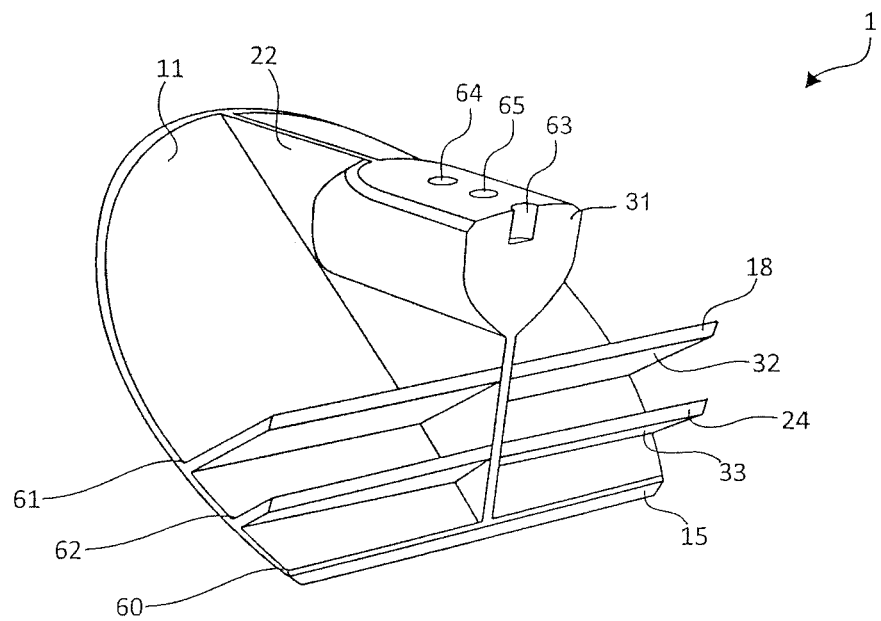
FIG. 7 illustrates a cross-sectional view of an embodiment of a fluid flow obstruction device.

Further illustrated in FIG. 7, is a cross-sectional view of an embodiment of fluid flow obstruction device 1, similar to that shown in FIG. 4B, where a cross-section of fluid flow obstruction device 1 through anchor boss 31 is illustrated. The cross-section of anchor boss 31 includes starter holes 63, 64, 65 for anchor 35 at locations above corresponding apexes 60, 61, 62 of each h/D ratio wall, i.e. second wall 15, third wall 18 and/or additional wall 24. Part of the late stage customization is tapping the appropriate starter hole with the anchor 35 female mating thread. The diameter of starter holes 63, 64, 65 is such that when anchor hole is drilled and tapped into the appropriate starter hole, the other unused starter holes do not interfere with the threads of the tapped anchor hole. FIG. 7 illustrates a first apex 60, which corresponds with the apex of first wall 11 and second wall 15, is aligned with first starter hole 63. A second apex 61, which corresponds to the apex of first wall 11 and third wall 18, is in line with a second starter hole 64. Third apex 62, which corresponds to the apex of first wall 11 and additional wall 24, is aligned with third starter hole 65.

Figure 8:
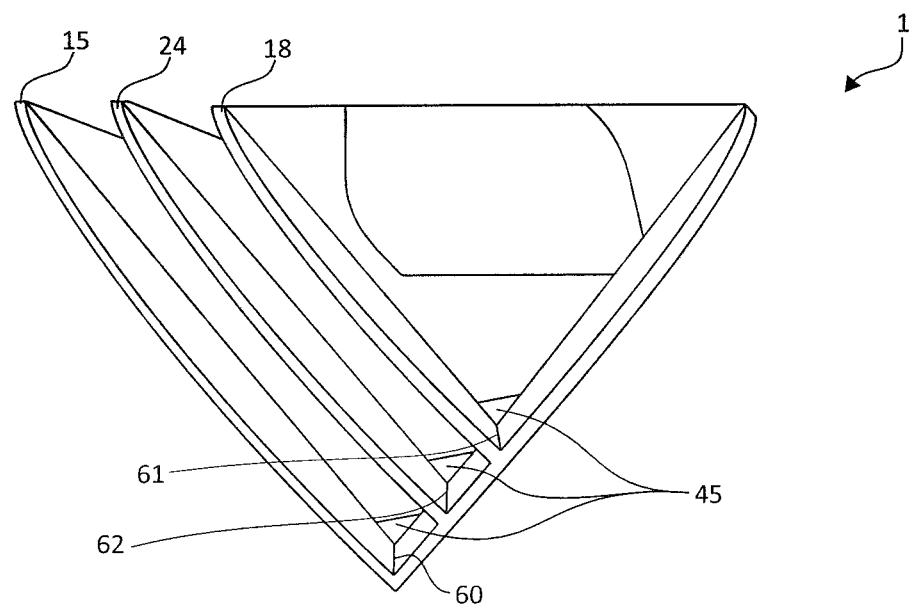
FIG. 8 illustrates an embodiment of a fluid flow obstruction device

FIG. 8 illustrates an embodiment of fluid flow obstruction device 1 similar to that shown in FIG. 4B. Fluid flow obstruction device 1 includes at least one drain hole 45 arranged on each side of each rib 22 at the intersection of rib 22 and each apex 60, 61, 62. In an embodiment, drain hole 45 does not link the high and low pressure sides, but instead the zones on either side of rib 22. Each drain hole 45 allows condensate or liquid to drain out of fluid flow obstruction device 1. This configuration aids in preventing water freezing and expanding within fluid flow obstruction device 1.

Figure 9:
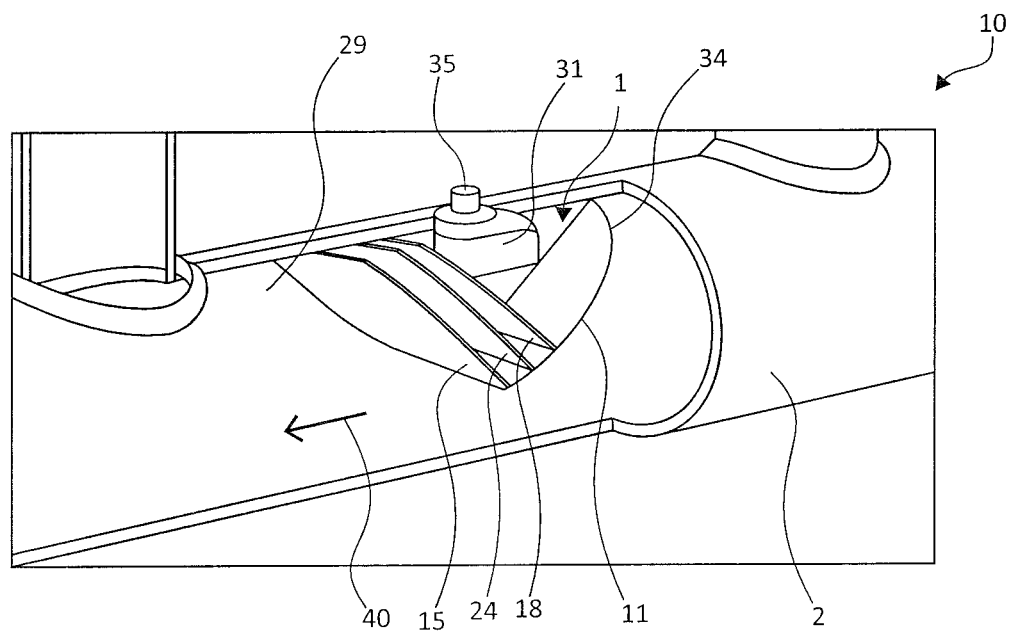
FIG. 9 illustrates a cutaway embodiment of a fluid flow obstruction device.

FIG. 9 illustrates a cutaway of fluid flow conduit 10 with fluid flow obstruction device 1 attached to body 2 of fluid flow conduit 10, where an outside diameter 34 of fluid flow obstruction device 1 may be contoured to be flush or slightly under flush with an inner diameter 29 of body 2, curving with interior diameter of body 2, where at least distal end 14 of first wall 11 and at least one of distal end 17 of second wall 15 and distal end 20, 26 of at least one additional wall 18, 24 inner diameter 29 of body 2. Fluid flow obstruction device 1 is able to be inserted into fluid flow conduit 10 and anchored into place using anchor 35. Fluid flows in the direction of arrow 40 where first wall 11 is arranged on the upstream side of fluid flow obstruction device 1 and second wall 15, third wall 18 and any additional wall 24 is arranged on the downstream side of fluid flow obstruction device 1. Anchor boss 31 holds at least one anchor 35 to secure and attach fluid flow obstruction device 1 to fluid flow conduit 10.

Figure 10:
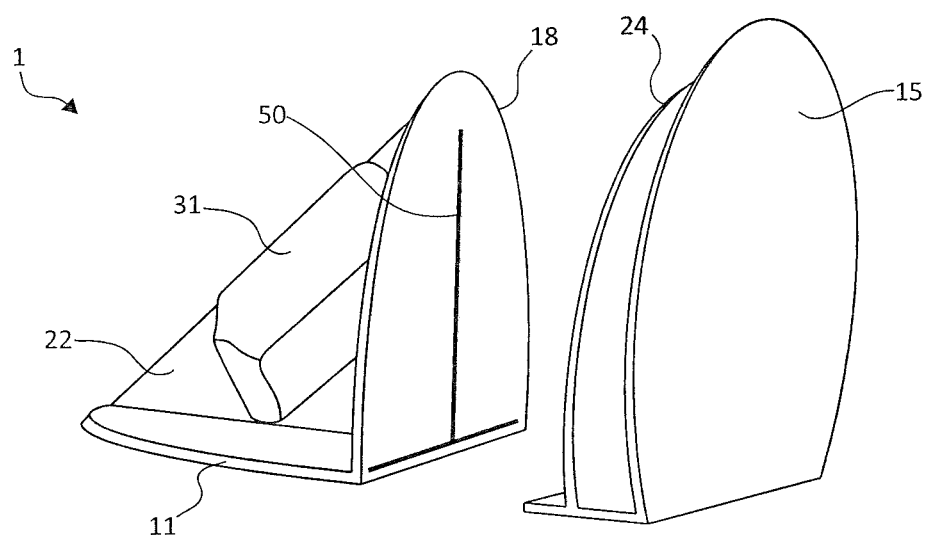
FIG. 10 illustrates an embodiment of modifying a fluid flow obstruction device to a different h/D ratio.

FIG. 10 illustrates an embodiment of modifying a fluid flow obstruction device 1 to different h/D ratios when a specific h/D ratio is requested or needed. The fluid flow obstruction device 1 is configured to be late-stage-customized, meaning one or two easily modifiable parts can be stocked to accommodate different fluid flow conduit sizes, instead of five to ten separate h/D ratio parts. Once a specific h/D ratio is needed to fulfil an order that was placed, fluid flow obstruction device 1 can be modified to the requested h/D ratio. Remnant 50, on third wall 18, additional wall 24 and/or first wall 11 can be ground or milled flush or smoothed.

In a non-limiting example, if the requested h/D ratio is the default as-manufactured fluid obstruction device, in other words, at second wall 15, no late-stage customization cutting and grinding operations is necessary. By way of non-limiting example, if fluid flow obstruction device 1 is manufactured with a default h/D ratio of 0.2 and an order requires a 0.2 h/D fluid flow obstruction device, no sawing or grinding operation is needed to turn modify fluid flow obstruction device 1 to the requested 0.2 h/D ratio. In this example, fluid flow obstruction device 1 is left unmodified and may be attached within fluid flow conduit 10 and comprises second wall 15 and at least one additional wall 18, 24.

Alternatively, if the requested h/D ratio is not at the default h/D ratio, but is instead at a different ratio, i.e. h/D ratio 0.3 at additional wall 24, then second wall 15 and rib 22 are cut from fluid flow obstruction device 1 along additional wall cutting side 33 at notch 30 arranged in rib 22 as a late-stage customization. Fluid flow obstruction device 1 is left with third wall 18 and additional wall 24 while second wall 15 has been removed.

As another non-limiting example, if the requested h/D ratio, i.e. h/D ratio 0.4 third wall 18, second wall 15 and additional wall 24 are cut from fluid flow obstruction device 1 along third wall cutting side 32 at notch 30 arranged in rib 22 as a late-stage customization. Fluid flow obstruction device 1 is left with third wall 18 while second wall 15 and additional wall 24, if present, is removed.

Fluid flow obstruction device 1, as illustrated FIG. 4A, may be configured, by way of non-limiting example, with fluid flow obstruction device 1 default as-manufactured h/D ratio of 0.5. Third wall 18 may be arranged at h/D ratio of 0.6. FIG. 4B may be configured, by way of non-limiting example, with fluid flow obstruction device 1 default as-manufactured h/D ratio of 0.2 and can be modified into a 0.3 and 0.4 h/D wedge.

Figure 11:
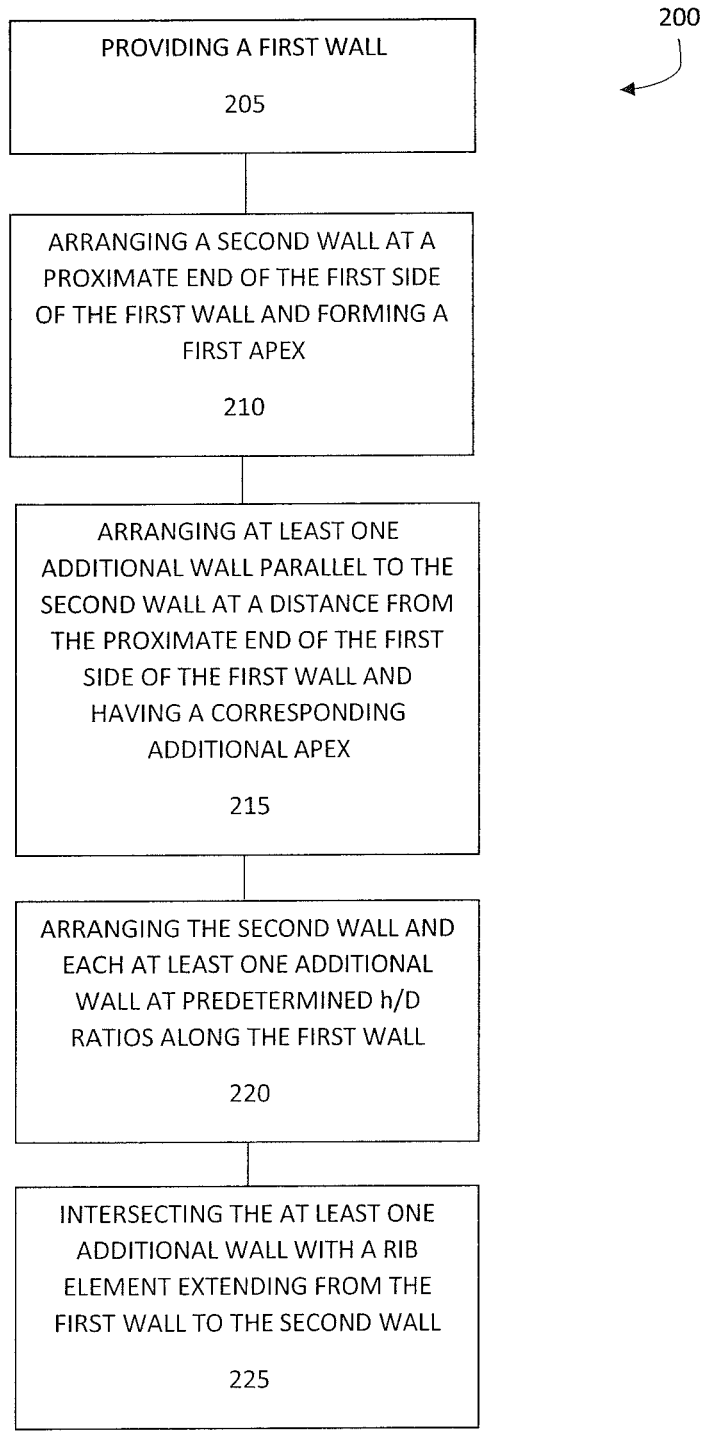
FIG. 11 illustrates an embodiment of a method of manufacturing a fluid flow obstruction device.

FIG. 11 illustrates an embodiment of a method 200 of manufacturing fluid flow obstruction device 1. The first step 205 is to provide first wall 11. The second step 210 is to arrange second wall 15 at a first wall proximate end 13 and forming a first apex 60. The third step 215 is arranging at least one additional wall 18, 24 parallel to second wall 15 at a distance from first wall proximate end 13 along first side 12 of first wall 11 and having a corresponding at least one additional apex, i.e. second apex 61 and/or third apex 62. The fourth step 220 is to arrange second wall 15 and each of the additional walls, i.e. third wall 18 and/or additional wall 24, at predetermined h/D ratios along first side 12 of first wall 11. A fifth step 225 is to intersect each of the at least one additional wall 18, 24 with rib 22 extending from first wall distal end 14 to second wall distal end 17.

Figure 12:
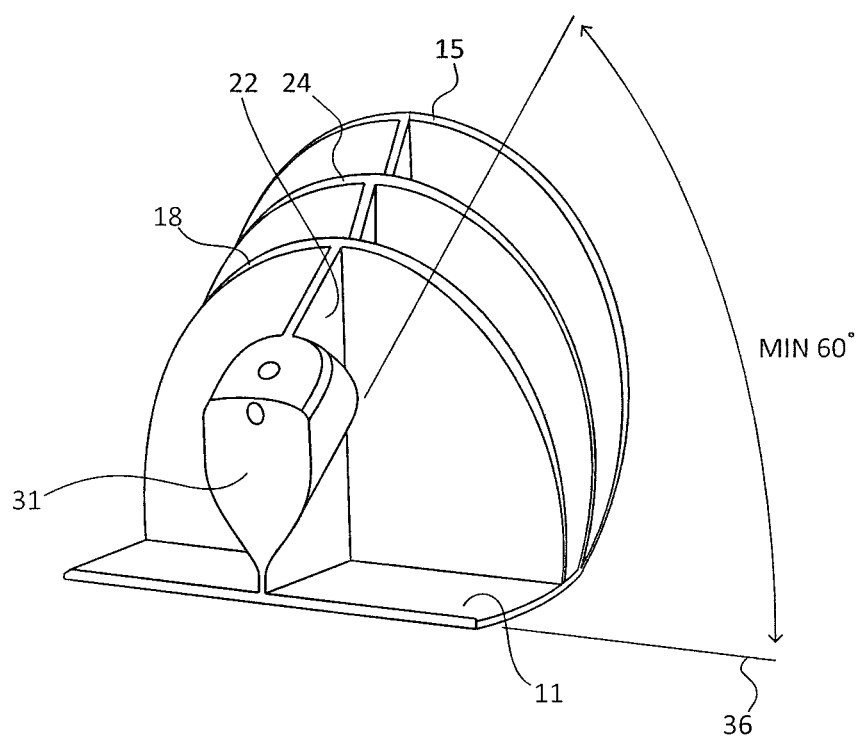
FIG. 12 illustrates an embodiment of a fluid flow obstruction device.

For a self-supporting design, in an embodiment, each feature of fluid flow obstruction device is manufactured with an angle over 60 degrees from horizontal 36. FIG. 12 illustrates fluid flow obstruction device 1 having a horizontal 36 planar with first wall 11. Each feature is arranged least 60 degrees with respect from horizontal 36. In one embodiment, rib 22, second wall 15 and at least one additional wall 18, 24 are manufactured at 90 degrees, or in a longitudinal direction 37, from horizontal 36. Manufacturing second wall 15 and additional walls 18, 24 to be perpendicular to first wall 11 and rib 22 to be perpendicular to each of first wall 11, second wall 15 and the at least one additional wall 18, 24 aids in providing structural integrity from induced forces or pressures from any direction.

Figure 13:
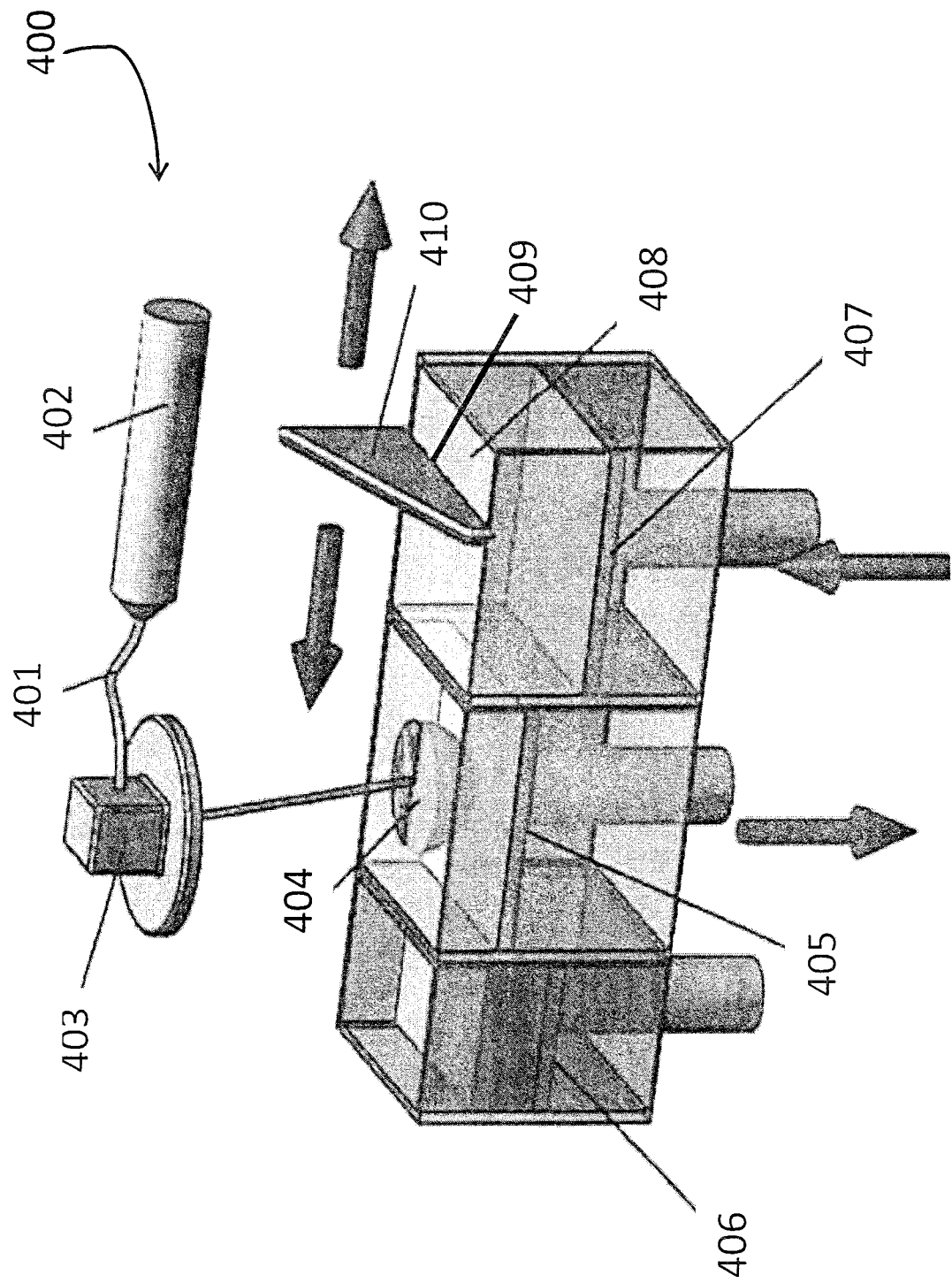
FIG. 13 illustrates an embodiment of an additive manufacturing system.

The described fluid flow obstruction device 1 is formed as a single, self-supporting structure. There are several available methods including casting and an additive manufacturing (AM) method for metals 250. A non-limiting example of an AM method is laser powder bed fusion (LPBF), sometimes referred to as direct metal laser sintering (DMLS). FIG. 13 illustrates a general DMLS Process diagram 400. The basic principle of this process is very densely packed metal powder 408 is fused by a laser 402, such as a $CO_2$ laser, in a 3D printer in thin layers upwards from a building platform 405, which is lowered by one layer of thickness, until the final part 404 is fully melted together. The 3D printer consists of a dispenser platform 407 for the metal powder 408 and a sintering/melting unit, which in the case of FIG. 13 includes laser unit 402, fibre 401 and scan head 403. Laser unit 402 selectively sinters/melts powder 408 with respect to the layer geometry of fluid flow obstruction device 1. After sintering/melting of a layer, the powder dispenser platform 407 moves upward and/or building platform 405 downward a distance equal to the thickness of a layer to supply the powder 408 required for printing a new layer and a recoater blade 409 on a recoater 410 transfers powder 408 to the sintering/melting zone by moving from the right position to the left position. Excess material falls onto the collector platform 406. The same process continues until the fabrication of the last layer of the fluid flow obstruction device 1 is formed.

The self-supporting design of fluid flow obstruction device 1, meaning no lattice or support structures are needed during a printing process, makes wedge element, or fluid flow obstruction device 1, a cost-effective and practical candidate for AM. Further, the cost of an AM component is related to volume and the amount of material for fluid flow obstruction device 1 is reduced, the cost of producing fluid flow obstruction device 1 is reduced.

Figure 14:
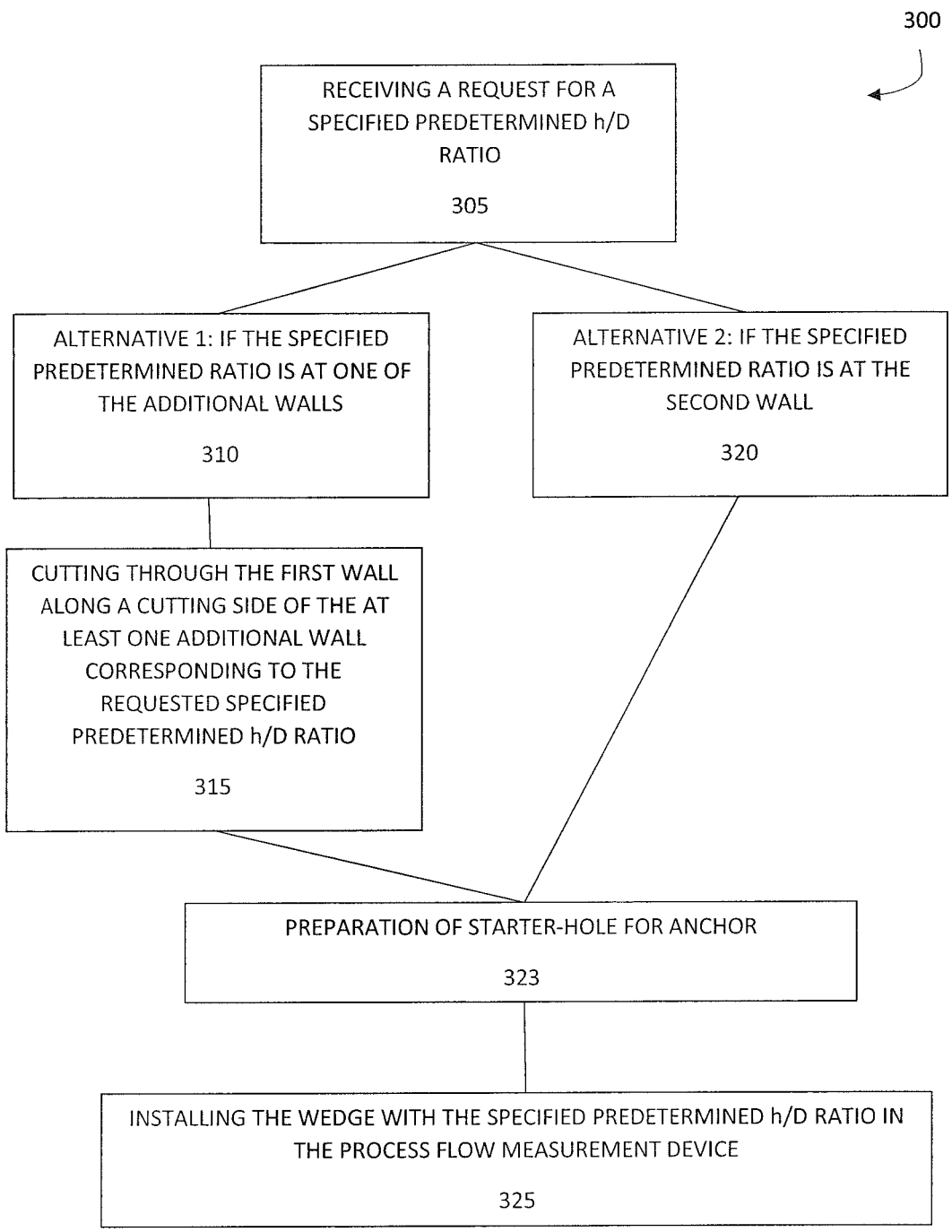
FIG. 14 illustrates an embodiment of a method of preparing a fluid flow obstruction device for a fluid flow conduit.

FIG. 14 illustrates an embodiment of a method 300 of preparing fluid flow obstruction device 1 manufactured in FIG. 11 for installation in process control system 100. In a first step 305, a request for a specified predetermined h/D ratio is received. In a second step, there are two alternative steps depending on the requested h/D ratio of step 305: in a first alternative step 310, the specified, or requested, predetermined ratio is at one of the additional walls, i.e. third wall 18 or additional wall 24. In this option, a third step 315 of cutting through first wall 11 along cutting side of the additional wall corresponding to the requested predetermined h/D ratio is performed. A second alternative step 320 occurs when the specified predetermined ratio is at second wall 15, or the default as-manufactured ratio. In this case, no cutting is performed. In a fourth step 323, starter-hole 63, 64, 65 corresponding to the apex 60, 61, 62 of the requested h/D ratio is optionally prepared for anchor 35. The preparation may include tapping the starter-hole. The final step 325 is to install the fluid flow obstruction device, with the specified predetermined h/D ratio, in process control system 100 using anchor 35 through anchor boss 31 and attaching fluid flow obstruction device to body 2 of fluid flow conduit 10.

Although the present invention has been described with reference to preferred embodiments, workers skilled in the art will recognize that changes may be made in form and detail without departing from the spirit and scope of the specification.

What is claimed is:

1. A fluid flow obstruction device for a process fluid flow measurement device, the fluid flow obstruction device comprising:
   a first wall having a first side;
   a second wall having a proximate end arranged at a proximate end of the first side of the first wall forming a first apex; and
   at least one additional wall arranged parallel to the second wall at a distance from the proximate end of the first side of the first wall forming a corresponding additional apex;
   wherein a distal end of the first wall and at least one of a second wall distal end and an at least one additional wall distal end are configured to contact an interior wall of a flowmeter conduit;
   a rib contacting the first side of the first wall and extending to the second wall, intersecting the at least one additional wall;
   wherein the rib is arranged perpendicular to the first wall, the second and the at least one additional wall.

2. The fluid flow obstruction device of claim 1, wherein the rib extends linearly from the distal end of the first wall along the first side to the second wall.

3. The fluid flow obstruction device of claim 1, further comprising an anchor boss arranged on the rib.

4. The fluid flow obstruction device of claim 1, wherein the at least one additional wall includes a third wall and an additional wall.

5. The fluid flow obstruction device of claim 1, further comprising a notch in the rib arranged on a cutting side of the at least one additional wall, wherein the notch is adjacent to the at least one additional wall.

6. The fluid flow obstruction device of claim 1, wherein sides of the rib, adjacent to a cutting side of the at least one additional wall, comprises a cutting guide.

7. The fluid flow obstruction device of claim 1, wherein each of the second wall and the at least one additional wall are arranged at a specific h/D ratio point.

8. A system for measuring process fluid flow, the system comprising:
   a fluid flow conduit having an inlet and an outlet;
   the fluid flow obstruction device of claim 1; and
   a differential pressure sensor disposed to sense differential process fluid pressure on either side of the fluid flow obstruction device.

9. The system for measuring process fluid flow of claim 8, further comprising a rib arranged contacting a first side of the first wall, extending to the second wall, intersecting the at least one additional wall;
   wherein the rib is arranged perpendicular to the first wall, the second and the at least one additional wall.

10. The system for measuring process fluid flow of claim 9, further comprising an anchor boss arranged on the rib, wherein the anchor boss further comprises at least one hole for an anchor.

11. The system for measuring process fluid flow of claim 10, wherein each hole is aligned with a corresponding apex.

12. The system for measuring process fluid flow of claim 10, wherein the fluid flow obstruction device is secured to the fluid flow conduit with the anchor.

13. The system for measuring process fluid flow of claim 12, wherein the first wall is arranged on either the inlet side or the outlet side of the fluid flow conduit and the second wall and/or the at least one additional wall is arranged on an opposite side of the fluid flow conduit.

14. The system for measuring process fluid flow of claim 8, wherein the second wall and/or the at least one additional wall are each arranged at a specific h/D ratio point.

15. The fluid flow obstruction device of claim 1, further comprising an anchor boss arranged on the rib, wherein the anchor boss further comprises at least one hole for an anchor.

16. The fluid flow obstruction device of claim 15, wherein each hole is aligned with a corresponding apex.

17. A method of manufacturing a fluid flow obstruction device for a process fluid flow measurement device comprising:
   providing a first wall having a first side,
   arranging a second wall at a proximate end of the first side of the first wall and forming a first apex,
   arranging at least one additional wall parallel to the second wall at a distance from the proximate end of the first side of the first wall and forming a corresponding additional apex, and
   intersecting each of the at least one additional wall with a rib extending linearly from the first wall to the second wall.

18. The method of claim 17, further comprising cutting through the rib and the first wall along a cutting side of the at least one additional wall to a specified h/D ratio.

19. The method of claim 17, further comprising forming the fluid flow obstruction device as a single self-supporting structure.

* * * * *